United States Patent
Kou et al.

(10) Patent No.: US 8,347,126 B2
(45) Date of Patent: Jan. 1, 2013

(54) CURRENT LIMITING AND AVERAGING CIRCUIT AND PERIPHERAL DEVICE AND COMPUTER SYSTEM USING THE SAME

(75) Inventors: Fang-Yu Kou, Hsinchu (TW); Jui-Hui Lin, Hsinchu County (TW); Jui-I Wu, Hsinchu (TW); Hung-Jen Hou, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 227 days.

(21) Appl. No.: 12/874,127

(22) Filed: Sep. 1, 2010

(65) Prior Publication Data

US 2011/0208981 A1    Aug. 25, 2011

(30) Foreign Application Priority Data

Feb. 22, 2010    (TW) ................................ 99105064 A

(51) Int. Cl.
*G06F 1/26* (2006.01)
(52) U.S. Cl. ........................................ 713/300; 320/134
(58) Field of Classification Search .................. 713/300; 320/134
See application file for complete search history.

(56) References Cited

U.S. PATENT DOCUMENTS

| 7,254,723 B1 * | 8/2007 | Favey et al. ............ 713/300 |
| 2003/0214273 A1 * | 11/2003 | Mah et al. ............... 323/271 |
| 2011/0208981 A1 * | 8/2011 | Kou et al. ............... 713/300 |

* cited by examiner

*Primary Examiner* — Albert Wang
(74) *Attorney, Agent, or Firm* — Rabin & Berdo, P.C.

(57) ABSTRACT

A current limiting and averaging circuit for driving a peripheral core circuit with a lower limit current value in response to a supply signal, includes a current limiting module, an energy storage module, and a converter module. The current limiting module provides a limited supply signal whose current value is smaller than or equal to an upper limit value according to the supply signal. The energy storage module stores a storage signal according to the limited supply signal when the upper limit value is higher than the lower limit current value and provides a discharge signal according to the storage signal when the upper limit value is lower than the lower limit current value. The converter module provides a driving signal for driving the peripheral core circuit in response to the limited supply signal or the limited supply signal and the discharge signal.

6 Claims, 1 Drawing Sheet

CURRENT LIMITING AND AVERAGING CIRCUIT AND PERIPHERAL DEVICE AND COMPUTER SYSTEM USING THE SAME

This application claims the benefit of Taiwan application Serial No. 099105064, filed Feb. 22, 2010, the subject matter of which is incorporated herein by reference.

BACKGROUND OF THE INVENTION

1. Field of the Invention

The invention relates in general to a current limiting and averaging circuit, and more particularly to a current limiting and averaging circuit for the peripheral device of computer system.

2. Description of the Related Art

With the rapid advance in technology, wireless communication transmission has become an indispensable means of communication for people in their everydayness and business as well. In general, the wireless communication module used for performing wireless communication transmission normally operates in the manner of Time Division Duplex (TDD) to perform the operations of signal reception and signal transmission in a reception period and a transmission period respectively. In the transmission period, the wireless communication module is driven by instantaneous high current with high power driving force for supporting the operation of signal transmission. In the reception period, the wireless communication module requires a lower level of power driving force. In other words, the wireless communication module requires different levels of power driving forces in different operation periods. Thus, how to design a driving circuit which provides suitable driving force according to the requirements of the wireless communication module has become an imminent task for the industries.

SUMMARY OF THE INVENTION

The invention is directed to a current limiting and averaging circuit for supplying power to a peripheral core circuit. The current limiting and averaging circuit has a current limiting module for limiting the current of the supply signal to a fixed upper limit current value and an energy storage module for averaging the time of the limited supply signal. Thus, the current limiting and averaging circuit provides corresponding power driving forces to the peripheral core circuit in different operation periods.

According to a first aspect of the present invention, a computer testing system including a host device and a peripheral device is provided. The host device provides a supply signal via a supply path. The peripheral device, which operates according to the supply signal, includes a peripheral core circuit and a current limiting and averaging circuit. The peripheral core circuit has a lower limit current value. The current limiting and averaging circuit, which drives the peripheral core circuit in response to the supply signal, includes a current limiting module, an energy storage module and a converter module. The current limiting module limits the current of the supply signal for providing a limited supply signal whose current value is smaller than or equal to an upper limit current value. The energy storage module stores the storage signal in response to the limited supply signal when the upper limit current value is higher than the lower limit current, and provides a discharge signal according to the storage signal when the upper limit current value is lower than the lower limit current. The converter module provides a driving signal for driving the peripheral core circuit in response to the limited supply signal when the upper limit current value is higher than the lower limit current value, and provides a driving signal for driving the peripheral core circuit in response to the limited supply signal and the discharge signal when the upper limit current value is lower than the lower limit current value.

According to a second aspect of the present invention, a peripheral device, which operates according to a supply signal provided by a host device, is provided. The peripheral device includes a peripheral core circuit and a current limiting and averaging circuit. The peripheral core circuit has a lower limit current value. The current limiting and averaging circuit, which drives the peripheral core circuit in response to the supply signal, includes a current limiting module, an energy storage module and a converter module. The current limiting module limits the current of the supply signal for providing a limited supply signal whose current value is smaller than or equal to an upper limit current value. The energy storage module stores the storage signal in response to the limited supply signal when the upper limit current value is higher than the lower limit current, and provides a discharge signal according to the storage signal when the upper limit current value is lower than the lower limit current. The converter module provides a driving signal for driving the peripheral core circuit in response to the limited supply signal when the upper limit current value is higher than the lower limit current value, and provides a driving signal for driving the peripheral core circuit in response to the limited supply signal and the discharge signal when the upper limit current value is lower than the lower limit current value.

According to a third aspect of the present invention, a current limiting and averaging circuit, which is used in the peripheral device, is provided. The peripheral device, which operates according to a supply signal provided by a host device, includes a peripheral core circuit with a lower limit current value. The current limiting and averaging circuit, which drives the peripheral core circuit in response to the supply signal, includes a current limiting module, an energy storage module and a converter module. The current limiting module limits the current of the supply signal for providing a limited supply signal whose current value is smaller than or equal to an upper limit current value. The energy storage module stores the storage signal in response to the limited supply signal when the upper limit current value is higher than the lower limit current, and provides a discharge signal according to the storage signal when the upper limit current value is lower than the lower limit current. The converter module provides a driving signal for driving the peripheral core circuit in response to the limited supply signal when the upper limit current value is higher than the lower limit current value, and provides a driving signal for driving the peripheral core circuit in response to the limited supply signal and the discharge signal when the upper limit current value is lower than the lower limit current value.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
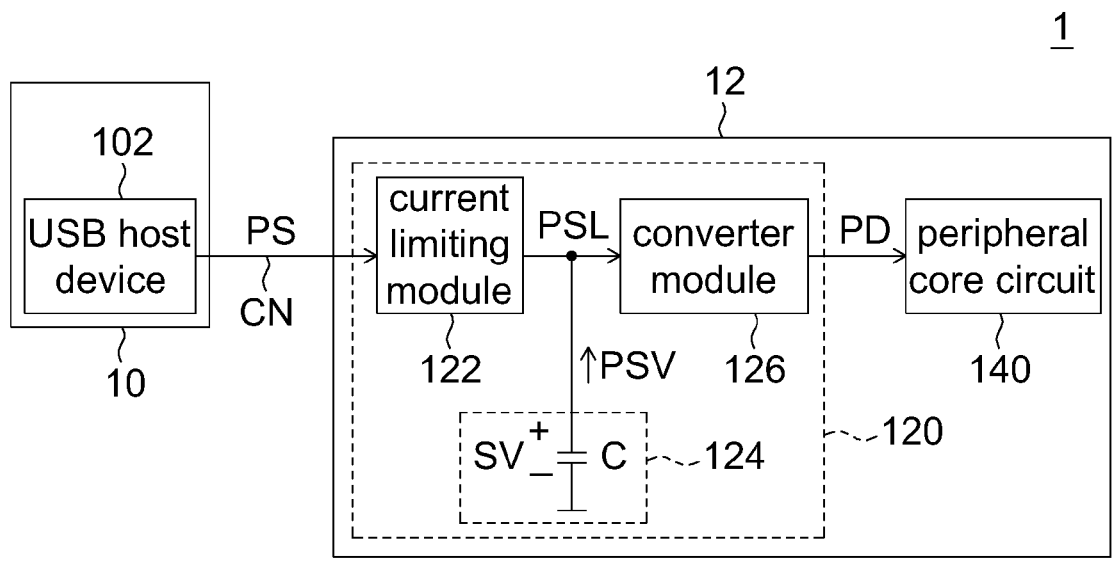
FIG. 1 shows a block diagram of a computer system according to an embodiment of the invention.

Referring to FIG. 1, a block diagram of a computer system according to an embodiment of the invention is shown. The computer system 1 includes a host device 10 and a peripheral device 12, wherein the host device 10 and the peripheral device 12 communicate with each other via a communication link CN. For example, the communication link CN is realized by a universal serial bus (USB), and the host device 10 includes a USB host device 102, which is used as a host and communicates with the peripheral device 12 via the communication link CN. The host device 102 further uses the communication link CN as a power supply path via which a supply signal PS is provided.

The peripheral device 12, which operates according to the supply signal PS, includes a current limiting and averaging circuit 120 and a peripheral core circuit 140. In an example, the peripheral core circuit 140 is realized by a wireless communication interface device controlled by a host device 10 for receiving and transmitting wireless signals. The peripheral core circuit 140 has a lower limit current value, which corresponds to a value IR_min when the peripheral core circuit 140 receives wireless signals and corresponds to a value IT_min when the peripheral core circuit 140 transmits wireless signals. For example, the value IT_min is higher than the value IR_min.

The current limiting and averaging circuit 120 receives the supply signal PS, and accordingly provides a driving signal PD for driving the peripheral core circuit 140. The current limiting and averaging circuit 120 includes a current limiting module 122, an energy storage module 124 and a converter module 126.

The current limiting module 122 limits the current of the supply signal PS for providing a limited supply signal PSL. The current value of the limited supply signal PSL is smaller than or equal to an upper limit current value IP_max. For example, the upper limit current value IP_max ranges between the value IR_min and IT_min.

The energy storage module 124 stores a storage signal SV in response to the limited supply signal PSL when the lower limit current is lower than the upper limit current value IP_max. The energy storage module 124 provides a discharge signal DSV according to the storage signal SV when the lower limit current is higher than the upper limit current value IP_max. In an example, the energy storage module 124 includes a capacitor C, and the storage signal SV and the discharge signal DSV respectively are the voltage signal stored by the capacitor C in response to the limited supply signal PSL and the discharge current signal generated by the capacitor C according to the storage signal SV.

When the upper limit current value IP_max is higher than the lower limit current value (that is, when the lower limit current value corresponds to the value IR_min), the converter module 126 provides a driving signal PD for driving the peripheral core circuit 140 in response to the limited supply signal PSL. When the upper limit current value IP_max is lower than the lower limit current value (that is, when the lower limit current value corresponds to the value IT_min), the converter module 126 provides a driving signal PD for driving the peripheral core circuit 140 in response to the limited supply signal PSL and the discharge signal DSV.

Figure 2:
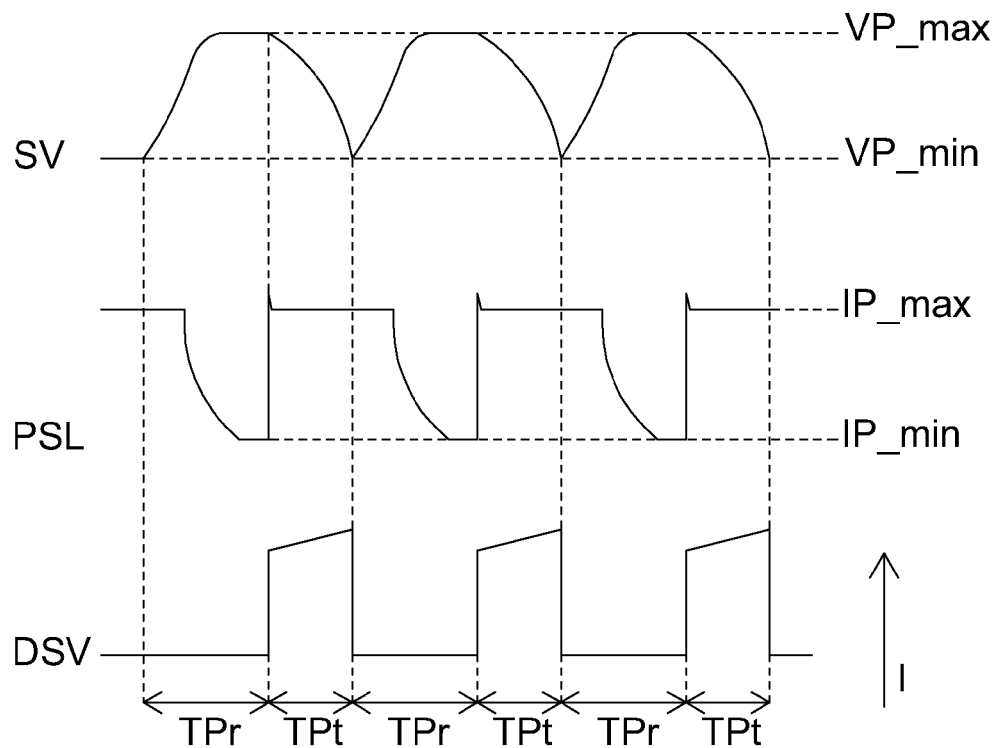
FIG. 2 shows a related signal timing diagram of FIG. 1.

Referring to FIG. 2, a related signal timing diagram of the current limiting and averaging circuit 120 of FIG. 1 is shown. For example, the supply of the current limiting and averaging circuit 120 is performed in the reception period TPr and the transmission period TPt.

During the reception period TPr, the peripheral core circuit 140 performs the operation of wireless signal reception. Meanwhile, the lower limit current value of the peripheral core circuit 140 corresponds to a value IR_min. Since the upper limit current value IP_max of the limited supply signal PSL is higher than the value IR_min, the limited supply signal PSL has a lower limit current value higher than the peripheral core circuit 140 during the reception period TPr. Also, the part of the power of the limited supply signal PSL not used by the peripheral core circuit 140 is provided to charge the capacitor C so that the voltage level of the storage signal SV is increased from an initial level VP_min to a terminate level VP_max. When the voltage level of the storage signal SV is charged to the terminate level VP_max, the current level of the limited supply signal PSL will drop to the value IR_min so that the peripheral core circuit 140 with sufficient driving force is continuously provided for performing corresponding operation of signal reception.

During the operation period TPt, the peripheral core circuit 140 performs the operation of wireless signal transmission. Meanwhile, the lower limit current value of the peripheral core circuit 140 corresponds to the value IT_min. Since the upper limit current value IP_max of the limited supply signal PSL is lower than the value IT_min, in other words, the limited supply signal PSL has a lower limit current value lower than the peripheral core circuit 140. Thus, the limited supply signal PSL corresponds to the upper limit current value IP_max, and the capacitor C is correspondingly charged and generates a discharge current signal, that is, the discharge signal DSV. The sum of the currents of the discharge signal DSV and the limited supply signal PSL is designed to be higher than value IT_min, so as to continuously provide the peripheral core circuit 140 with sufficient driving force is continuously provided for performing corresponding operation of signal reception.

For example, the converter module 126 has a minimum work input voltage. In the present embodiment of the invention, the level of the initial level VP_min of the storage signal SV is higher than or equal to the minimum work input voltage. Thus, despite the voltage level (that is, the voltage level of the storage signal SV) of the limited supply signal PSL continuously oscillates between its initial level VP_min and terminate level VP_max, the converter module 126 still can continuously convert the power and generate the driving signal PD for driving the peripheral core circuit 140 according to the input signal.

In the present embodiment of the invention, the peripheral core circuit 140 is exemplified by a wireless communication interface device. However, the peripheral core circuit 140 of the present embodiment of the invention is not limited thereto, and can also be realized by other peripheral devices.

The current limiting and averaging circuit of the present embodiment of the invention supplies power to a peripheral core circuit. The current limiting and averaging circuit of the present embodiment of the invention limits the current of the supply signal to a fixed upper limit current value by a current limiting module and averages the time of the limited supply signal by an energy storage module.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a host device for providing a supply signal via a supply path; and
   a peripheral device which operates according to the supply signal, wherein the peripheral device comprises:
   a peripheral core circuit having a lower limit current value for normal operation; and
   a current limiting and averaging circuit for driving the peripheral core circuit in response to the supply signal, wherein the current limiting and averaging circuit comprises:
   a current limiting module for limiting the current of the supply signal for providing a limited supply signal whose current value is smaller than or equal to an upper limit current value;
   an energy storage module for storing a storage signal in response to the limited supply signal when the lower limit current value is lower than the upper limit current value and for providing a discharge signal according to the storage signal when the lower limit current value is higher than the upper limit current value, wherein
      a voltage level of the storage signal is increased from an initial level to a terminate level when the lower limit current value is lower than the upper limit current value, and
      when the voltage level of the storage signal is charged to the terminate level, a current level of the limited supply signal drops to the lower limit current value; and
   a converter module for providing a driving signal for driving the peripheral core circuit in response to the limited supply signal when the upper limit current value is higher than the lower limit current value and for providing a driving signal for driving the peripheral core circuit in response to the limited supply signal and the discharge signal when the upper limit current value is lower than the lower limit current value.

2. The computer system according to claim 1, wherein the lower limit current value corresponds to a first value in a first operation period and corresponds to a second value in a second operation period, the first value is lower than the upper limit current value, and the second value is higher than the upper limit current value.

3. A peripheral device operating according to a supply signal provided by a host device, wherein the peripheral device comprises:
   a peripheral core circuit having a lower limit current value for normal operation; and
   a current limiting and averaging circuit for driving the peripheral core circuit in response to the supply signal, wherein the current limiting and averaging circuit comprises:
   a current limiting module for limiting the current of the supply signal for providing a limited supply signal whose current value is smaller than or equal to an upper limit current value;
   an energy storage module for storing a storage signal in response to the limited supply signal when the upper limit current value is higher than the lower limit current and for providing a discharge signal according to the storage signal when the upper limit current value is lower than the lower limit current value, wherein
      a voltage level of the storage signal is increased from an initial level to a terminate level when the lower limit current value is lower than the upper limit current value, and
      when the voltage level of the storage signal is charged to the terminate level, a current level of the limited supply signal drops to the lower limit current value; and
   a converter module for providing a driving signal for driving the peripheral core circuit in response to the limited supply signal when the upper limit current value is higher than the lower limit current value and for providing a driving signal for driving the peripheral core circuit in response to the limited supply signal and the discharge signal when the upper limit current value is lower than the lower limit current value.

4. The peripheral device according to claim 3, wherein the lower limit current value corresponds to a first value in a first operation period and corresponds to a second value in a second operation period, the first value is lower than the upper limit current value, and the second value is higher than the upper limit current value.

5. A current limiting and averaging circuit used in a peripheral device, which comprises a peripheral core circuit having a lower limit current value, the current limiting and averaging circuit, which drives the peripheral core circuit in response to a supply signal provided by a host device, comprising:
   a current limiting module for limiting the current of the supply signal for providing a limited supply signal whose current value is smaller than or equal to an upper limit current value;
   an energy storage module for storing a storage signal in response to the limited supply signal when the upper limit current value is higher than the lower limit current and for providing a discharge signal according to the storage signal when the upper limit current value is lower than the lower limit current value, wherein
      a voltage level of the storage signal is increased from an initial level to a terminate level when the lower limit current value is lower than the upper limit current value, and
      when the voltage level of the storage signal is charged to the terminate level, a current level of the limited supply signal drops to the lower limit current value; and
   a converter module used for providing a driving signal for driving the peripheral core circuit in response to the limited supply signal when the upper limit current value is higher than the lower limit current value and for providing a driving signal for driving the peripheral core circuit in response to the limited supply signal and the discharge signal when the upper limit current value is lower than the lower limit current value.

6. The current limiting and averaging circuit according to claim 5, wherein the lower limit current value corresponds to a first value in a first operation period and corresponds to a second value in a second operation period, the first value is lower than the upper limit current value, and the second value is higher than the upper limit current value.

* * * * *